United States Patent [19]

Garcia Vacas

[11] Patent Number: 5,748,622
[45] Date of Patent: May 5, 1998

[54] BURST ALIGNMENT PROCEDURE

[75] Inventor: Maria Teresa Garcia Vacas, Salamanca, Spain

[73] Assignee: Alcatel NV, Netherlands

[21] Appl. No.: 676,389

[22] PCT Filed: Nov. 27, 1995

[86] PCT No.: PCT/EP95/04662

§ 371 Date: Oct. 17, 1996

§ 102(e) Date: Oct. 17, 1996

[87] PCT Pub. No.: WO96/17452

PCT Pub. Date: Jun. 6, 1996

[30] Foreign Application Priority Data

Nov. 30, 1994 [ES] Spain .................. 9402471

[51] Int. Cl.$^6$ .................. H04B 7/212
[52] U.S. Cl. .................. 370/337; 455/426
[58] Field of Search .................. 370/321, 322, 370/337, 347, 348, 442, 443, 350, 507, 508, 519; 371/5.4, 32, 33; 375/356, 357, 358, 362, 371; 455/422, 426

[56] References Cited

U.S. PATENT DOCUMENTS

| 4,688,217 | 8/1987 | Ishi et al. | 370/347 |
| 4,773,065 | 9/1988 | Kobayashi et al. | 370/362 |
| 5,043,982 | 8/1991 | Werner | 370/507 |
| 5,317,571 | 5/1994 | Marcel et al. | 370/508 |
| 5,355,515 | 10/1994 | Sicher | 455/438 |
| 5,363,373 | 11/1994 | Nakahara et al. | 370/314 |
| 5,513,248 | 4/1996 | Evans et al. | 455/465 |

Primary Examiner—Wellington Chin
Assistant Examiner—Soon-Dong Hyun
Attorney, Agent, or Firm—Ware, Fressola, Van Der Sluys & Adolphson LLP

[57] ABSTRACT

Burst alignment procedure between cordless terminals (T) and their base stations (BS), from which the cordless terminals (T) in question obtain the reference for their timebase. This burst alignment procedure is applicable in digital cordless communications systems with time division multiple access, to ensure the correct reception of the bursts received with different delays due to propagation effects. In this procedure, the cordless terminals (T) retransmit successively, up to a maximnum number of times, the first bursts to their base stations (BS), bringing them forward on each retransmission by a number of bits, depending on the inter-channel guard space, until an answer is received from their base stations (BS) once they are correctly synchronized with them.

5 Claims, 2 Drawing Sheets

BURST ALIGNMENT PROCEDURE

TECHNICAL FIELD

This invention refers to a burst alignment procedure between a cordless terminal and its base station. This procedure is of particular application in digital cordless communications systems with time division multiple access, to ensure the correct reception of bursts received with different delays due to propagation effects.

BACKGROUND OF THE INVENTION

Many communications systems, formed by a set of cordless terminals and a number of base stations, were developed with reduced range (picocells) for indoor use, the separation between the cordless terminals and the base stations being very small. Presently, the initial application of these systems is being reconsidered with a view to employing them in larger spaces, where there is an increased distance between the base stations and the cordless terminals, for their use as an alternative to systems based on cellular technology. In these communications systems, the cordless terminals obtain their timebase reference from the base stations, so that the transmitting instants of the base stations coincide with those of reception in the cordless terminals, and vice versa.

Due to the configuration that the cordless systems were originally going to have, the standards developed for this technology do not lay down guidelines for overcoming the problems resulting from propagation delays due to the distance between the base stations and the cordless terminals, such as the problems of overlapping caused by the delay with which the messages are received with respect to the instant when they should have been received, resulting in the total or partial loss of information channels. This is particularly critical in systems with time division multiple access TDMA, and with a high bit rate, where such problems can arise but which were practically of no consequence for the distances between base stations and cordless terminals that existed in the original configuration intended for these systems.

The European standard ETS 300 175-3 "Digital European Cordless Telecommunication (DECT), Common Interface Part 3: Medium Access Control Layer", October 1992, developed by the RES (Radio Equipment and System) Technical Committee, in Annex D "Synchronization", page 186, references, for this DECT system, the three types of synchronization between the cordless terminals and base stations for correct transmission and reception of the bursts interchanged: burst synchronization, frame synchronization and multiframe synchronization.

This European standard does not incorporate any procedure for compensating the delay due to propagation (which impedes the correct synchronization between the base stations and the cordless terminals, and which causes overlapping problems), since this is not a critical problem in the applications for which the system was intended. Consequently this European standard does not establish solutions for the problem that arises in base stations when the bursts coming from the different cordless terminals associated with the base stations are received with different delays due to the variation in distances existing between these cordless terminals and the base stations, which can result in interference between the two equipments that frequently produces the total or partial loss of information channels.

As a consequence of the foregoing, the technical problem to be resolved lies in achieving a correct synchronization between cordless terminals and their base stations when the distance between them is increased, so that the bursts coming from these cordless terminals are correctly received in the base stations, without the propagation delay due to distance preventing correct synchronization between the base station and the cordless terminals, avoiding burst overlapping problems with total or partial loss of information or channels.

SUMMARY OF THE INVENTION

This invention presents a burts alignment procedure between cordless terminals and their base stations, when these cordless terminals are located at some distance from their base stations, this procedure being of application in digital cordless systems.

The procedure consists in the cordless terminals bringing forward the moment at which they send their bursts with respect to the reference obtained from the base stations, in the event of no answer having been received in a determined period of time to a first burst transmitted by these terminals to the base stations. This advance in time is repeated up to a maximum number of bits, depending on the size of the inter-channel guard space used in the system, in order to attain correct synchronization with their base stations and compensate the delay produced in the propagation path of the signals transmitted by both equipments, cordless terminals and base stations.

The advantage of using this procedure is that a greater range is achieved between the cordless terminals and their base stations, which can reach several kilometers, through compensating the propagation delay due to distance, avoiding thereby the loss of channels and information by overlapping at the point of reception. In this way it is possible to extend the range of application of the digital cordless systems, resulting in a competitive alternative to cellular systems.

BRIEF DESCRIPTION OF THE DRAWINGS

A fuller explanation of the invention can be found in the following description of a preferred implementation based on the figures attached, in which.

BEST MODE FOR CARRYING OUT THE INVENTION

Figure 1:
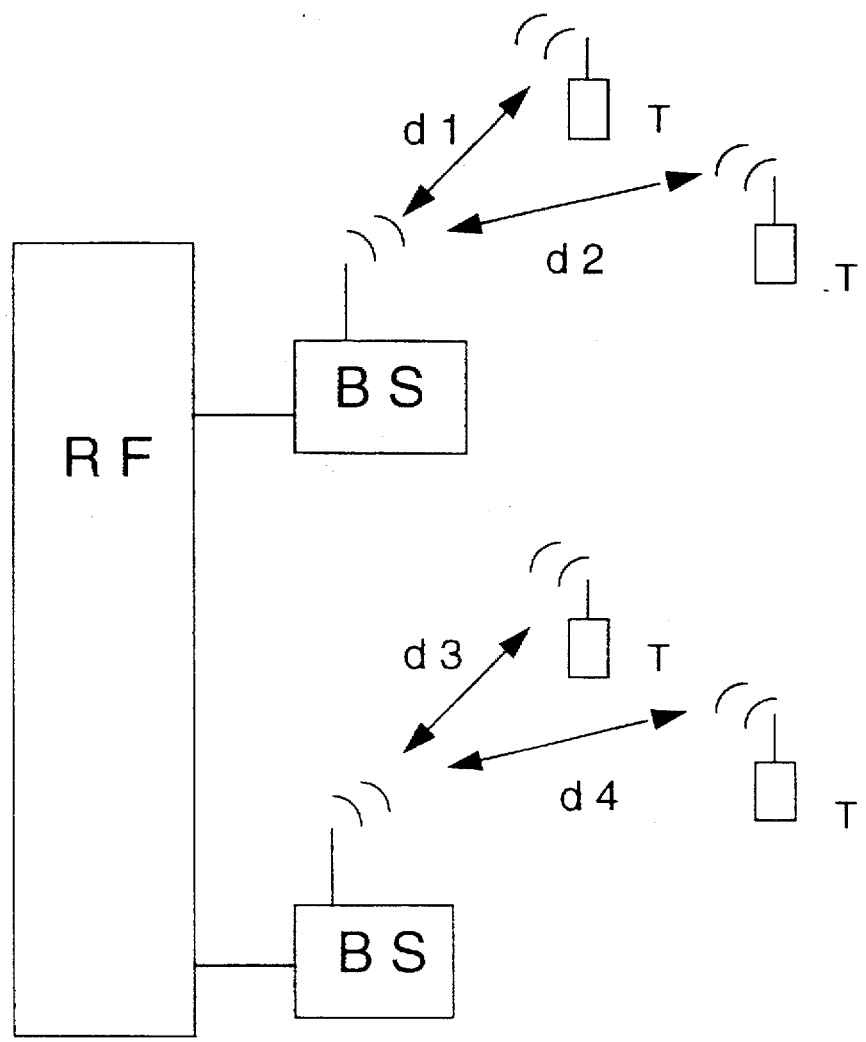
FIG. 1 illustrates the system on which the burst alignment procedure object of this invention has been implemented.

The diagram of FIG. 1 shows the cordless communications system in which the burst alignment procedure of this invention has been implemented in order to ensure the correct reception in the base stations of the bursts received with different delays because of propagation effects. It concerns a radio access system for access by cordless subscribers to a fixed network RF.

This system comprises a set of base stations BS that allow access from this system to the fixed network RF, and a set of cordless terminals T. The base stations BS are connected by wire to the fixed network RF. The cordless terminals T are connected by radio with the base stations BS, these cordless terminals T being located at different distances d1,d2,d3,d4 from their corresponding base stations BS. In this implementation, in order to extend the range of the cordless systems, directional antennas have been used in the base stations BS.

The technology employed in the system configuration is the European DECT (Digital European Cordless Telecommunications) standard, which makes use of TDMA frames of 11,520 bits and 10 ms duration, with 24 channels of 416.6 ps, there being twelve channels for transmission and twelve for reception. Each of the 24 channels of 480 bits, numbered 0 to 479, includes a 56 bit guard space. Moreover the European standard provides for a permissible shift in clocks that can be up to two bits.

The cordless terminals T have to synchronize their timebases with those of the base stations BS before they can obtain service, so that the transmitting instants of the base stations coincide with those of receiving in the cordless terminals, and vice versa, and the communications between the two take place correctly.

This synchronization of the cordless terminals T is achieved through the reception at physical layer level of bursts sent from the base stations BS. The possible states that the cordless terminals T can adopt, as a function of their synchronization, are:

Non-locked State: defined as the state in which the cordless terminal T is not synchronized at any level with any base station BS.

Pre-locked State: defined as the state in which the cordless terminal
T is receiving the frame and multiframe synchronizing references coming from the base station BS, as well as information on its identity, but is not yet synchronized with the latter.

Locked State: defined as the state in which the cordless terminal T is synchronized at all levels with the base station BS, that is, it has acquired burst, frame and multiframe synchronization.

The burst alignment procedure object of this invention is carried out by the cordless terminal T in the state defined above as the pre-locked state.

Figure 2:
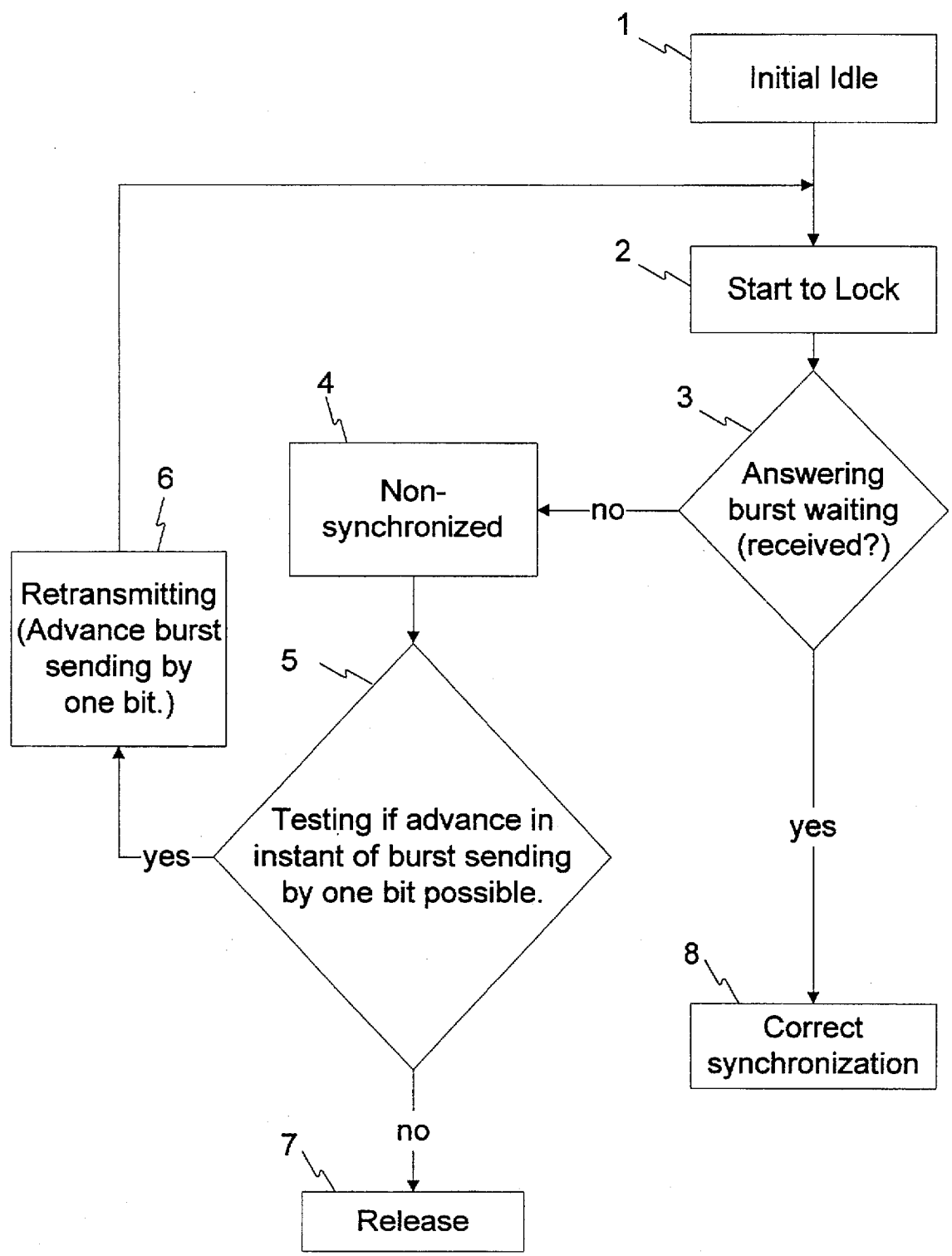
FIG. 2 shows a flowchart of consecutive states in the system in the burst alignment procedure object of this invention, during the base station locking phase.

FIG. 2 shows the flowchart of successive states in the system in the burst alignment procedure object of this invention, during the base station locking phase.

Starting from an initial idle state 1, in which the cordless terminal T is obtaining the reference for its timebase from the base station BS, it verifies, from the information it has received from the base station BS, that it has permission to communicate with the latter; at this point the system evolves to the start-to-lock state 2 in which the cordless terminal T sends a burst to the base station BS. The system passes to the answering burst waiting state 3, in which the cordless terminal T waits a predetermined time to receive the answering burst to the first burst it sent. If the answering burst coming from the base station BS is received by the cordless terminal T within the predetermined time, the cordless terminal T understands that it is correctly synchronized with the base station BS and the system evolves to the correct synchronization state 8 with the base station BS, the cordless terminal T then passing to the locked state.

In the event that the predetermined period for the answering burst waiting time 3 expires before the cordless terminal T has received the answering burst from the base station BS to the first burst it sent, the system evolves to the non-synchronized state 4, in which the cordless terminal T is not synchronized correctly with the base station BS because the burst has not been received correctly in the base station BS due to the propagation delay caused by the distance that separates the cordless terminal T from the base station BS.

The system evolves to the testing state 5, in which the cordless terminal T checks if it can or cannot advance the instant of burst sending by one more bit, in order to compensate the delay in reception of this first burst in the base station BS. The maximum number of bits that the cordless terminal T can advance the instant of burst sending is 54, which corresponds to the inter-channel guard space (except for the two clock shift bits permitted by the standard), the cordless terminal T advancing the burst sending instant by one bit each time.

In the testing state 5, the cordless terminal T checks if it has still not reached the maximum number of advanceable bits; if the answer is affirmative, the system evolves to the retransmitting state 6, in which the cordless terminal T then brings forward the instant of sending by one bit, and the system adopts once again the start-of-lock state 2. This process is repeated until the cordless terminal T manages to receive the answering burst from the base station BS or until the maximum number of bits by which it can advance the instant of sending its bursts is reached.

If the cordless terminal T attains this maximum number of bits without having received the answering burst from the base station BS, the terminal then considers it is located at too great a distance and locking on to the base station BS is impossible, at which point the system evolves to the release state 7.

I claim:

1. A burst alignment procedure in digital cordless communications systems with time division multiple access, between a cordless terminal (T) and its base station (BS), from which this cordless terminal (T) obtains its timebase reference; this procedure being characterised in that the cordless terminal (T) brings forward the instant of sending its bursts with respect to the reference received from the base station (BS) in the event that no answer is received, within a preset period of time, from the base station (BS) to a first burst transmitted by the cordless terminal (T) to its base station (BS).

2. A burst alignment procedure according to claim 1, characterised in that the cordless terminal (T) automatically repeats this advancement in the time of transmitting its bursts by a number of bits each time until it reaches correct synchronization with its base station (BS) in the event that it continues not to receive an answer.

3. A burst alignment procedure according to claim 2, characterised in that the total number of bits by which the cordless terminal (T) brings forward the instant of transmitting its bursts as well as the maximum number of times that this can be done, is limited by the size of the inter-channel guard space of the system.

4. A burst alignment procedure according to claim 1, characterised in that the cordless terminals (T) are considered to be synchronized with the base stations (BS) when they receive an answer, within the preset period of time, to the burst sent to the base stations (BS).

5. A cordless terminal (T) associated with a base station (BS) for use in cordless digital communications systems, characterised in that the cordless terminal automatically and successively brings forward, up to a maximum number of bits, the moment of transmitting its bursts with respect to the timebase reference obtained from the base station (BS) in the event that no answer is received from this base station (BS) in response to the bursts sent by this cordless terminal (T) within a preset period of time.

* * * * *